United States Patent
LeBlanc

(10) Patent No.: US 6,722,161 B2
(45) Date of Patent: Apr. 20, 2004

(54) RAPID GLASS MELTING OR PREMELTING

(75) Inventor: John R. LeBlanc, Roanoke, VA (US)

(73) Assignee: The BOC Group, Inc., Murray Hill, NJ (US)

( * ) Notice: Subject to any disclaimer, the term of this patent is extended or adjusted under 35 U.S.C. 154(b) by 16 days.

(21) Appl. No.: 10/122,976

(22) Filed: Apr. 15, 2002

(65) Prior Publication Data

US 2002/0166343 A1 Nov. 14, 2002

Related U.S. Application Data

(60) Provisional application No. 60/288,363, filed on May 3, 2001.

(51) Int. Cl.$^7$ .............................................. C03B 5/225
(52) U.S. Cl. ................... 65/134.4; 65/134.5; 65/136.2; 65/136.3
(58) Field of Search ............................ 65/134.1, 134.4, 65/134.5, 135.2, 135.9, 136.2, 136.3

(56) References Cited

U.S. PATENT DOCUMENTS

| | | | |
|---|---|---|---|
| 3,015,190 A | * | 1/1962 | Arbeit |
| 3,305,340 A | * | 2/1967 | Atkeson |
| 3,337,324 A | | 8/1967 | Cable, Jr. et al. |
| 3,375,095 A | | 3/1968 | Poole |
| 3,558,297 A | | 1/1971 | Carney et al. |
| 3,582,307 A | | 6/1971 | Mulfinger et al. |
| 3,617,231 A | | 11/1971 | Fenstermacher et al. |
| 3,622,296 A | | 11/1971 | Buehl |
| 3,752,895 A | | 8/1973 | Clishem et al. |
| 3,754,886 A | | 8/1973 | Richards et al. |
| 3,811,859 A | | 5/1974 | Ernsberger |
| 3,811,860 A | | 5/1974 | Nier |
| 3,960,532 A | | 6/1976 | Lazet |
| 4,002,449 A | | 1/1977 | Spanoudis |
| 4,019,888 A | | 4/1977 | Verhappen et al. |
| 4,194,077 A | | 3/1980 | Canfield et al. |
| 4,195,981 A | | 4/1980 | Penberthy |
| 4,312,657 A | | 1/1982 | Canfield et al. |
| 4,345,106 A | | 8/1982 | Canfield et al. |
| 4,405,351 A | | 9/1983 | Sheinkop |
| 4,409,012 A | | 10/1983 | Miller |
| 4,468,164 A | | 8/1984 | Dunn et al. |
| 4,473,388 A | | 9/1984 | Lauwers |
| 4,478,628 A | | 10/1984 | Dunn |
| 4,504,302 A | | 3/1985 | Carman |
| 4,536,205 A | | 8/1985 | Krumwiede et al. |
| 4,539,034 A | | 9/1985 | Hanneken |
| 4,544,396 A | | 10/1985 | Krumwiede et al. |
| 4,545,800 A | | 10/1985 | Won et al. |
| 4,565,560 A | | 1/1986 | Krumwiede et al. |
| 4,600,425 A | | 7/1986 | Krumwiede et al. |
| 4,610,711 A | | 9/1986 | Matesa et al. |
| 4,632,687 A | | 12/1986 | Kunkle et al. |
| 4,634,461 A | | 1/1987 | Demarest, Jr. et al. |
| 4,718,931 A | | 1/1988 | Boettner |
| 4,794,860 A | | 1/1989 | Welton |
| 4,798,616 A | | 1/1989 | Knavish et al. |
| 4,816,056 A | | 3/1989 | Tsai et al. |

(List continued on next page.)

FOREIGN PATENT DOCUMENTS

EP 1 077 201 A2 2/2001

*Primary Examiner*—Sean Vincent
(74) *Attorney, Agent, or Firm*—Joshua Cohen

(57) ABSTRACT

A method for melting glass forming batch material includes charging the glass forming batch material to a glass melting apparatus; impinging a flame proximate to the surface of the batch materials to form a glass melt from the batch material; and bubbling the glass melt in proximity to the impinging flame with a fluid, advantageously producing a shearing action sufficient to enhance the solution rate of the glass forming batch material relative to the same system without bubbling, but without splashing glass and without significant production of seeds or blisters in the glass melt. Melting of the glass forming batch material with bubbling proceeds more quickly, and/or at lower temperatures than occurs in a comparable conventional glass melting furnace.

23 Claims, 2 Drawing Sheets

U.S. PATENT DOCUMENTS

| | | |
|---|---|---|
| 4,818,265 A | 4/1989 | Krumwiede et al. |
| 4,831,633 A | 5/1989 | Argent |
| 4,852,118 A | 7/1989 | Pieper |
| 4,919,700 A | 4/1990 | Pecoraro et al. |
| 5,006,144 A | 4/1991 | Knavish et al. |
| 5,116,399 A | 5/1992 | Lauwers |
| 5,139,558 A | 8/1992 | Lauwers |
| 5,364,426 A | 11/1994 | Richards |
| 5,536,291 A | 7/1996 | Sorg et al. |
| 5,586,999 A | 12/1996 | Kobayashi |
| 5,665,137 A | 9/1997 | Huang |
| 5,785,940 A | 7/1998 | Carroll et al. |
| 5,922,097 A | 7/1999 | Kobayashi et al. |
| 6,041,622 A | 3/2000 | Duchateau et al. |
| 6,154,481 A | 11/2000 | Sorg et al. |
| 6,237,369 B1 | 5/2001 | LeBlanc et al. |
| 6,354,110 B1 | 3/2002 | Alchalabi et al. |
| 6,355,587 B1 | 3/2002 | Loxley et al. |
| 6,422,041 B1 | 7/2002 | Simpson et al. |
| 2001/0039813 A1 | 11/2001 | Simpson et al. |

* cited by examiner

RAPID GLASS MELTING OR PREMELTING

CROSS REFERENCE TO RELATED APPLICATIONS

This application claims the benefit of the filing date of U.S. Provisional Application for Patent Ser. No. 60/288,363, filed May 3, 2001.

BACKGROUND OF THE INVENTION

A glass melter refers to a glass furnace that produces glass that has a quality level suitable to manufacture a commercial glass product. A premelter is a glass furnace that completes only one of two quality requirements to make most commercial glasses. The two requirements are melting and fining. Melting is the dissolution of glass raw material particles in a melt to produce glass with no remaining undissolved particles. Fining or refining (used synonymously in the industry) is the elimination of gaseous bubbles in the melt that are commonly referred to in the industry as seeds and blisters. The premelter completes most or all of the melting process but not the refining process. Glass that exits a premelter may pass through another melter or refiner to complete the required level of fining.

Submerged combustion in a glass melting furnace is the introduction of a fuel and an oxidant into a glass melt from the bottom of the melt such that they combust and pass the combustion products up through the melt. One of the most unique and desirable features of submerged combustion glass melting is the low temperature required to achieve a relatively high degree of melting of the raw materials used to produce the glass. It has been shown that it is possible to melt the glass raw materials at temperatures of 1950–2000° F. at a rate of 2 tons of melt per square foot of melt surface area, and achieve a melting efficiency of 98–99% (i.e. only 1–2% of unmelted raw materials remaining). This compares to typical melting temperatures of 2750–2900° F. for most glasses. In submerged combustion, the unmelted portion was silica (sand) grains and these were reduced in size from their initial state. Melting at this rate and within this temperature range had not been possible by any other known melting technology.

The primary reason that this degree of melting is attainable at such low temperatures is due to the violent mixing action that takes place within the melt as the gases combust and bubble through the melt. The strong shearing action that takes place between the molten glass and the unmelted raw material particles greatly accelerates the melting action.

Another positive feature of submerged combustion is the relatively low rate of wear of the refractories that make up the crown, walls and bottom of the furnace due to the low operating temperature required to melt the glass.

One of the unfavorable features and disadvantages of submerged combustion for most glasses is the high quantity of gaseous bubbles that are entrapped in the glass. These gases are from the combustion products and consist of carbon dioxide and nitrogen if the oxidant is air, and carbon dioxide if the oxidant is high purity oxygen. Water vapor, which is also a component of the combustion gases, is mostly dissolved into the glass. The additional time to fine this glass (i.e., rid the glass of seeds and blisters), negates the benefits of the rapid, low temperature premelting.

A second negative feature of submerged combustion is the extent of agitation that occurs as the bubbles rise up through the glass. The bubbles rise at an explosive rate which results in glass being spewed or flung throughout all portions of the furnace above the glass; i.e. the crown and the breast walls, which may harm the furnace refractory and reduce the useful life of the furnace.

A third negative feature of submerged combustion melters and premelters is the objectionable noise that they may produce. Depending upon several variables, such as the burner design, flame velocity, glass temperature and glass depth, the noise can range from a loud, continual thumping sound as the glass erupts at the melt surface and then flops down, to a loud, high frequency squeal.

Bubbling gases up through the glass melting glass furnaces is not uncommon. It consists of installing one or more tubes, called bubblers, through the bottom of the furnace and passing a gas through the bubblers. The bubblers are usually placed in one or more rows across the width of the furnace. They are not typically placed throughout the bottom, however. The purpose of bubbling is primarily to enhance the glass convection currents in the furnace, i.e., upwelling and turnover of the melt. This will bring hot glass from the top of the melt to the bottom and cold glass from the bottom to the top. This action increases the solution rate of the raw materials in the melt. Air is the gaseous medium most commonly used for bubbling; oxygen is occasionally used. One potential disadvantage of bubbling, like submerged combustion, is an increased quantity of seeds and blisters in the melt if the gas bubbled through the glass is nitrogen (as in the case of bubbling with air), or carbon dioxide.

Direct flame impingement melting is described in U.S. Pat. No. 6,237,369 to LeBlanc et al., which is incorporated herein by reference as if fully written out below. An advantage of melting with one or more burners in the roof of a glass furnace over the raw materials used to produce the glass, is an increased rate of melting for a given size glass furnace. This is accomplished as a result of greater heat transfer into the raw material batch and glass.

SUMMARY OF THE INVENTION

The present invention is directed to a method of melting glass raw materials more rapidly than is possible at comparable temperatures conventionally, or at lower than conventional glass melting temperatures. Included in the inventive method are favorable features of different glass melting technologies, namely submerged combustion, increasing the water content in glass, bubbling gases through the glass melt, and direct flame impingement melting, while many of the negative aspects of those technologies are avoided.

By glass melting apparatus, as used herein, is meant either a glass premelter or a glass melter (or glass melting furnace), as described above.

The present invention provides a method for melting glass forming batch material including charging the glass forming batch material to a glass melting apparatus; impinging a flame from the combustion of fuel and oxidant proximate to the surface of the batch material to form a glass melt from the batch material; and, bubbling the glass melt in proximity to the impinging flame with at least one fluid capable of solution in the glass melt. Bubbling with such a fluid can produce a shearing action sufficient to enhance the solution rate of the glass forming batch material relative to the same system without bubbling, but without splashing glass and without significant production of seeds or blisters in the glass melt.

The present invention further provides a method for melting glass forming batch material including:

charging the glass forming batch material to a glass melting apparatus, said glass melting apparatus having at least one wall defining an upstream charging zone and a downstream zone connected to a roof and a floor, wherein at least one batch charger for charging the glass forming batch material is contained in the at least one wall defining the charging zone;

providing at least one oxy-fuel burner in the roof over said batch material;

operating the at least one oxy-fuel burner to impinge a flame from the combustion of fuel and oxidant proximate to the surface of the batch material to form a glass melt from the batch material;

providing spaced apart bubblers in the glass melting apparatus; and, bubbling the glass melt with at least one fluid capable of solution in the glass melt proximate to the impinging flame.

The present method advantageously proceeds without significant production of seeds or blisters in the glass exiting to a glass fining zone. Further, the fluid is advantageously bubbled at a rate to produce a shearing action sufficient to enhance the solution rate of the glass forming batch material relative to the same system without bubbling, but without splashing glass onto the glass melting apparatus walls or roof.

DETAILED DESCRIPTION OF THE INVENTION

The present invention is preferably carried out in a glass premelter, for melting glass that is to be passed to a separate glass melting furnace or to a refiner, but is applicable additionally to a glass melter having both a melting zone and a fining zone. The use of bubblers in a glass melting apparatus allows more rapid and/or lower temperature melting of the raw glass batch materials, in part by increasing convection currents in the glass melt or batch. The action of the bubblers works to mix the batch from underneath, so as to expose new, cooler unmelted batch materials to the flames of the roof mounted oxy-fuel burners for melting. Concurrently, flames from the burners mounted in the furnace crown provide significantly higher heat transfer to the glass and glass batch than is possible with conventional flames in a glass furnace. The flames from the burners through the crown provides heat to the glass and glass batch by both convective and radiative heat transfer, unlike conventional glass furnaces in which essentially all heat is transferred to the glass and glass batch by radiation only.

Figure 1:
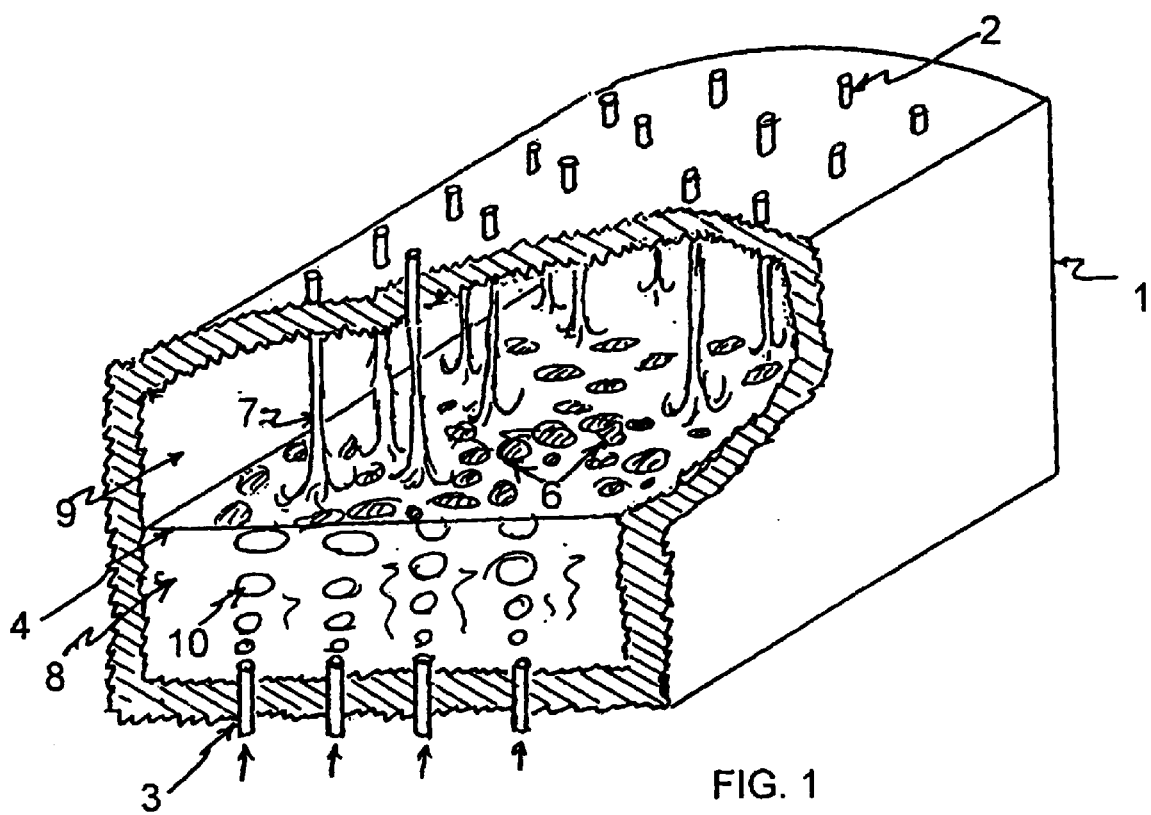
FIG. 1 is a cutaway perspective view of a rapid premelter operated in accordance with the method of the present invention.
Figure 2:
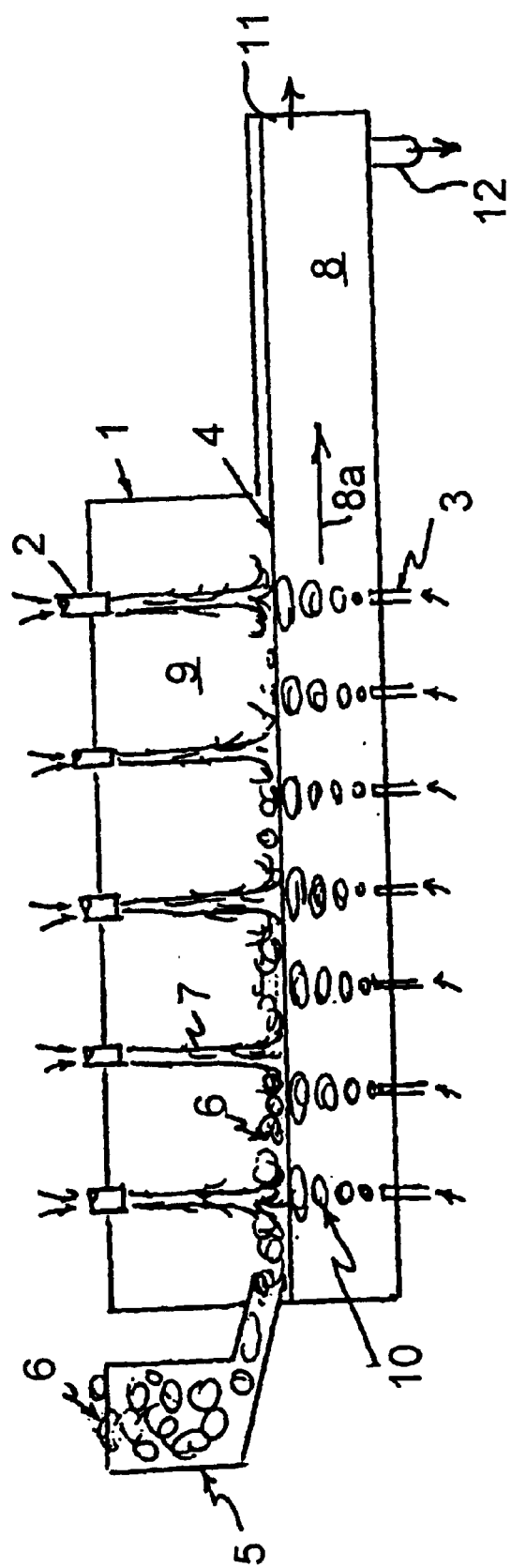
FIG. 2 is a schematic, longitudinal elevation view of a rapid premelter operated in accordance with the method of the present invention.

The method of the present invention includes bubbling the glass melt with a fluid that is capable of solution or dissolving in the glass melt, so as to not produce seeds or blisters in the glass. In one embodiment of the invention, the method includes bubbling water or steam in at least some of the bubblers. It is within the scope of the invention to position the bubblers at predetermined spacing throughout the furnace bottom as shown in FIGS. 1 and 2, rather than merely disposing them in rows, and to bubble the gases at a rate that will result in approaching the shearing action observed in submerged combustion, without spewing glass onto the superstructure of the furnace or creating objectionable noise. Further, energy is preferably supplied to the melt by direct flame impingement oxy-fuel burners mounted in the roof of the furnace as shown in FIGS. 1 and 2.

According to the invention, the glass raw material melting is completed more rapidly, and/or at temperatures significantly lower than conventional glass furnaces. This is accomplished by increasing the proportion of heat transfer from the combusted fuel into the batch and melt, thus reducing the proportion of heat that would result in an increase in the temperature of the furnace combustion space. The bubblers are spaced under the roof-mounted burner(s) in a fashion that maximizes flame contact with the bubbles emanating from the bubblers. In one embodiment, the bubblers are radially disposed with respect to the center of the flame impingement contact area with the surface of the glass batch or melt.

The increased water content of the glass from both utilization of oxy-fuel combustion and the bubbling of water or steam, lowers the viscosity of the glass and increases the shearing action of the bubbling, thus enabling the bubbling, mixing and melting process to take place at significantly lower temperatures and/or more rapidly than is possible by conventional melting. The temperatures at which the method of the present invention operates is within the range of about 2200° F. to about 2600° F., preferably between about 2200° F. to about 2400° F. to melt at least about 92% (preferably about 95%) of the batch raw materials at a rate of about one ton of glass per square foot of melting area (i.e., the surface area of the furnace's rapid melting zone or the pre-melter). Conventional glass furnaces operate at about one quarter to one half of that rate. Operating at lower glass temperatures significantly lowers the wear rate on the glass contact refractories in the premelter furnace. Further, use of the method of the present invention permits the fining tank downstream from the pre-melter to be operated at lower than conventional temperatures, thus lowering the wear rate of both the glass contact refractories and above glass refractories in the furnace. When the method of the present invention is employed, the fining tank may also be sized smaller than is currently needed with conventional glass melting furnaces for the same pull rate.

In a further embodiment of the present invention, specific gas species are selected to be bubbled through a portion of the bubblers in order to introduce certain desirable chemical properties into the glass. Examples of this include bubbling oxygen to increase the state of oxidation in the melt, or hydrogen to reduce the state of oxidation in the melt; these being desirable characteristics for specific glasses such as color control/color development. In the case of clear glass (commonly referred to as flint glass) higher states of oxidation will convert the small quantity of iron typically found in flint glass from its divalent state, $Fe+2$, to its trivalent state, $Fe+3$. The divalent state has a much stronger colorizing effect on the glass than the trivalent iron. Consequently, the more highly oxidized glass will be clearer. Bubbling with hydrogen or hydrogen sulfide can be used to produce amber or certain green glasses.

In another embodiment of the invention, $SO_2$ or $SO_3$ gas is bubbled for enhanced fining, and also to produce brown (amber) glass. Bubbling $SO_2$ or $SO_3$ further negates the requirement to add a sulfate to the batch, such as sodium sulfate or calcium sulfate, which are normally added to soda-lime-silicate glasses (U.S. Pat. No. 3,375,095 to Poole). Bubbling $SO_2$ or $SO_3$ is more efficient than adding the sulfates to the batch, that is, there is a greater retention of the $SO_2$ or $SO_3$ in the glass when bubbled. Consequently the quantity of particulates, $SO_2$ and sulfur based acids emitted from the furnace stack are reduced. Also, the quantity of sulfur oxide required by the glass to promote a given level of fining and melting is less when bubbled as a gas than when added as a solid or liquid sulfur-bearing raw material. This reduces the potential of having a condition of supersaturated sulfates in the glass, which can develop blisters in the glass, or a catastrophic foaming phenomenon to take place in the melt itself.

By bubbling with water or steam to increase the water content of the glass, certain other benefits, are realized. One example would be to lower the content of the alkali in the glass (U.S. Pat. No. 3,617,231 Fenstermacher and LeBlanc). Alkali and water both act as fluxes to reduce the viscosity of the glass and, consequently, the temperature to melt and fine the glass. Water is a much more powerful flux than alkali, but can only be added at much lower quantities in the glass. Replacing some alkali with water reduces raw material cost, reduces chemical attack on the glass contact refractories, reduces particulate emissions from the furnace stack and increases "workability" of the glass (an observation by persons involved in the forming process of making glass articles that they describe as making the glass more easily suited to being formed into a shape). Regarding refractory attack, if the alkali content of the glass is held constant, then the glass temperature can be lowered while maintaining the same viscosity. Affecting either parameter, lowering temperature or lowering alkali content, will reduce the rate of chemical attack on the glass contact refractories.

The bubbled fluid, such as gases, may be relatively cool with respect to the temperature within the bulk glass or the furnace atmosphere, or they may be heated. In one embodiment, hot exhaust flue gases may be used as the bubbling gas to increase heat transfer.

Suitable fuels for combustion in the roof-mounted oxy-fuel burner(s) include, but are not limited to, methane, natural gas, liquefied natural gas, propane, hydrogen, liquefied propane gas, butane, low BTU gases such as town gas, producer gas or the like, vaporized or atomized oil, kerosene or diesel fuel, or mixtures thereof, at either ambient temperature or in preheated form.

Preferred oxidants include oxygen-enriched air, containing greater than about 50 volume percent oxygen to about 80 volume percent, preferably greater than about 70 volume percent, such as produced by filtration, absorption, membrane separation, or the like; non-pure oxygen such as that produced by, for example, a vacuum swing adsorption process and containing about 80 volume percent to about 95 volume percent oxygen; and "industrially" pure oxygen containing about 90 volume percent to about 100 volume percent oxygen, such as is produced by a cryogenic air separation plant. The greater the quantity of combustion products that are present in an operating glass furnace, the higher the furnace superstructure temperature will be for a given bulk glass temperature. Generally, the higher the percentage of oxygen that is present in the oxidant, the higher the ratio will be of the bulk glass temperature to the furnace combustion space temperature (and thus the superstructure temperature, discussed below). The oxidant may be introduced at either ambient temperature or in preheated form. The fuel and the oxidant are generally introduced in the furnace through a burner assembly.

The burner assembly generally includes a burner block formed to include a flame chamber having inlet and outlet openings, burner means for discharging fuel into a flame chamber formed in the burner block and means for discharging oxygen into the flame chamber. In operation, discharged oxygen mixes with fuel provided by the discharging burner means inside the flame chamber. This combustible fuel and oxygen mixture can be ignited to define a flame having a root portion in the flame chamber in some instances, and a tip portion outside the flame chamber. If the burner assembly to be used comprises an "internally staged" burner for secondary combustion purposes, the burner block may further include bypass means for conducting oxygen outside of the flame chamber, such as to oxygen-discharge ports around the outlet opening of the flame chamber. In operation, oxygen may pass through the bypass means formed in the burner block to the oxygen-discharge ports, and be ejected from the burner block into a downstream "second-stage" region containing a portion of the flame and lying outside the flame chamber in the furnace, to heat the glass batch materials or melt.

According to the present invention, the at least one oxy-fuel burner(s) are preferably positioned in the roof (or crown) of the glass melting apparatus, or furnace, above the raw batch (and optionally, cullet) materials, and directed to the batch surface. The burners may be positioned as close as possible to the batch chargers where the coolest batch materials are, proximate to the furnace wall where the glass forming material is charged, to obtain rapid melting due to the higher thermal difference. The use of roof-mounted burners in glass melting furnaces is further disclosed in commonly assigned U.S. Pat. No. 6,422,041 and application Ser. No. 09/798,826, which are incorporated herein by reference as if fully written out below. A method for mounting such burners in the roof of glass melting furnaces is further disclosed in commonly assigned U.S. patent application Ser. No. 09/644,570, which is incorporated herein by reference as if fully written out below. The use of the roof-mounted direct flame impingement method for melting glass batch materials according to the method of the present invention, including bubbling of gases into the melt to achieve a shearing, mixing action, will result in the transfer of energy into the glass more rapidly and efficiently, so as to achieve a lower superstructure temperature for a given bulk glass temperature. The use of gas bubbling in a conventionally fired glass melting furnace, having burners that are horizontal or slightly angled with respect to the glass melt surface, cannot achieve this optimized ratio of bulk glass temperature to superstructure temperature.

The utilization of at least one roof mounted oxy-fuel burner(s) in the inventive method, provides in addition to a radiation heat transfer component, significant convective heat transfer due to the impingement and final reaction of reactive intermediate species such as carbon monoxide, hydrogen, and hydroxyl radicals, to stable combustion products such as carbon dioxide and water vapor, proximate to or at the glass batch surface. This type of heat transfer is enhanced when the oxy-fuel burner is either integrally (within the burner block) or externally staged (separate from the burner block), so as to delay a portion of the combustion, thereby lowering flame temperature and radiant heat losses until the glass surface is reached. As a result, heat transfer to the furnace superstructure is reduced. If the burner is externally staged, optionally at least one secondary oxidant injector is provided in the roof of the melting apparatus, to provide additional oxidant for completing combustion proximate to or at the surface of said glass forming material.

Controlled partial combustion in the free-jet region of the flame permits controlled combustion at the surface of the raw glass-forming material, thereby bringing the combustion process proximate to the surface of the raw glass-forming material. Bringing the combustion process proximate the surface of the raw glass-forming material generates an elevated temperature gradient at the surface of the raw glass-forming material thereby improving the convection heat transfer. Controlled partial combustion in the free-jet region generates an acceptable temperature for the chemical dissociation of the combustion gases and the products of combustion. These dissociated species, once impinged on the relatively colder surface of the raw glass-forming material, partially recombine, exothermically, generating significant heat at the surface of the raw glass-forming material. The heat from the exothermic reactions further augments the convective heat transfer process.

In one embodiment of the invention, the burner is mounted substantially perpendicular to the surface of the glass forming material, but may be mounted up to 45 degrees away from the perpendicular and toward the downstream zone of the glass melting apparatus, or furnace.

The raw glass-forming material may be a mixture of raw materials typically used in the manufacture of glass. It will be appreciated that the composition of the raw glass-forming material (or batch) is dependent on the type of glass being produced. Normally, the material comprises, inter alia, silica containing materials including scrap glass commonly referred to as cullet. Other glass-forming materials including but not limited to feldspar, nepheline syenite, limestone, dolomite, soda ash, potash, borax, kaolin clay and alumina may also be used. To alter the properties of the glass, a minor amount of arsenic, antimony, sulfates, sulfides, carbon, fluorides and/or other components may also be added. Moreover, oxides of barium, strontium, zirconium and lead may be added for special purpose glass, and other color forming metal oxides may be added to obtain the desired color.

Although this invention is applicable to various glass compositions, it is particularly well suited for a glass called soda-lime-silica. This glass is produced from three (3) basic ingredients: silica (sand), soda ash, and limestone. Essentially all bottles and flat glass (e.g., window glass), and most tableware glass are made of soda-lime-silica glass.

As shown in FIG. 1, a premelter or the rapid melting zone of a glass melter furnace 1 preferably contains roof mounted oxy-fuel burners 2. Gas bubbler tubes 3 or "bubblers" are positioned in the floor of the furnace 1. Bubbles 10 of fluid, such as gas, water or steam, emanate from the bubblers 3 into the glass bath 8, that is, the bulk glass, within the premelter or melting zone. The bubbles 10 aid in mixing the glass bath 8, so as to come into contact with and submerse raw or unmelted glass batch materials 6 floating on the surface of the glass bath, or glass line 4 to promote melting. Flames 7 from the combustion of oxygen and fuel (such as natural gas or oil) by means of the oxy-fuel burners 2 traverse the furnace combustion chamber 9 to impinge on raw, unmelted glass batch materials 6 proximate to the glass line 4.

As shown in FIG. 2, raw, unmelted glass batch materials 6 contained in a raw material hopper 5 are charged to the premelter or the rapid melting zone of a glass furnace 1 substantially at the glass line 4. The materials are rapidly melted by the combination of a) the flames 7 from the combustion of oxygen and fuel (such as natural gas or oil) within the furnace combustion chamber 9, from the roof mounted oxy-fuel burners 2, impinging on the unmelted materials 6 proximate to the glass line 4, and b) the action of the bubbles 10 of fluid, such as gas, water or steam, from the bubbler tubes 3 in the floor of the furnace 1, which bring melted glass 8 into mixing contact with the unmelted materials 6. The glass bath 8 flows downstream (as shown by the arrow 8a) of the charger to a glass exit 11 in the case of a premelter, or to a glass exit 12 in the case of a glass melter.

It is within the scope of the present invention to provide multiple roof mounted burners within the rapid glass melting apparatus, with more than one burner having bubblers associated with the burner, and the bubbling of gases occurring proximate to the multiple areas where the flames of the associated burners impinge on or near the surface of the batch material.

The melted glass bath may flow downstream through to the fining zone of the glass melter furnace, or to a conventional glass furnace or glass refining apparatus from the premelter. According to the method of the present invention, it is preferred that the bulk glass in the glass bath that is received by the furnace for fining, contain less than about 50% to about 80% of the seeds and blisters typically received in conventional furnaces. This results in higher quality glass being produced. Although contrasted from the glass melt, the amount of seeds that would typically be accepted in a glass container product is on the order of about 27 seeds per ounce of glass; less would be found acceptable in a float glass product.

In one embodiment of the present invention, a rapid premelter having roof-mounted oxy-fuel burners in association with bubblers positioned in the floor of the pre-melter may be removably positioned to feed molten glass into a conventional glass melter as a "charger" or into a glass refining apparatus. The apparatus may be mounted on wheels, rails, track, or an air flow pad, so as to be movable into engagement with and disengagement from the glass melter or refining apparatus. The pre-melter may be one of a plurality of such apparatus, feeding into a common channel connected to the glass melter or refining apparatus. Such a configuration would reduce or eliminate glass furnace downtime that would otherwise result from maintenance, repair or replacement of a premelter feeding the furnace.

Description of elements in FIGS. 1 and 2:
  Item 1 furnace, melter or premelter
  Item 2 oxy-fuel burners
  Item 3 bubbler tubes
  Item 4 glass line (surface or top of glass in melter)
  Item 5 raw material hopper
  Item 6 raw or unmelted glass batch materials
  Item 7 flames from oxy-fuel burners
  Item 8 the glass bath
  Item 8a the glass bath flow
  Item 9 the furnace combustion chamber
  Item 10 bubbles of gas and/or water and/or steam passed through bubblers
  Item 11 glass exit of premelter
  Item 12 glass exit of melter.

It should be appreciated that the present invention is not limited to the specific embodiments described above, but includes variations, modifications and equivalent embodiments defined by the following claims.

I claim:

1. A method for melting glass forming batch material comprising:
  charging the glass forming batch material to a glass melting apparatus, said glass melting apparatus having at least one wall defining an upstream charging zone and a downstream zone connected to a roof and a floor, wherein at least one batch charger for charging the glass forming batch material is contained in the at least one wall defining the charging zone;

providing at least one oxy-fuel burner in the roof over said batch material;

operating the at least one oxy-fuel burner to impinge a flame from the combustion of fuel and oxidant proximate to the surface of the batch material to form a glass melt from the batch material;

providing spaced apart bubblers in the glass melting apparatus; and, bubbling the glass melt with at least one fluid capable of solution in the glass melt proximate to the impinging flame.

2. The method as in claim 1 including bubbling the glass melt with water or steam from at least one of the bubblers.

3. The method as in claim 1 including bubbling the glass melt with a gas selected from the group consisting of at least one of hydrogen, hydrogen sulfide, oxygen, $SO_2$, $SO_3$, and hot exhaust flue gas, from at least one of the bubblers.

4. The method as in claim 1 including maintaining an operating temperature in the glass melting apparatus in the range of about 2200° F. to about 2600° F.

5. The method as in claim 1 including fully combusting reactive intermediate species proximate to or at the glass forming batch material surface.

6. The method as in claim 1 wherein the oxy-fuel burner is contained in a burner block, further wherein said operating the at least one oxy-fuel burner comprises at least one of providing integral staging of said oxidant via injection from the same oxy-fuel burner block and providing external staging of said oxidant via injection separate from the oxy-fuel burner block.

7. The method of claim 6 further comprising providing at least one secondary oxidant injector in the roof of the glass melting apparatus for providing additional oxidant for completing combustion proximate to or at the surface of said glass forming batch material.

8. The method of claim 1 wherein the glass forming batch material enters the glass melting apparatus through at least one charger, including providing the at least one oxy-fuel burner in the roof of the glass melting apparatus above the unmelted glass forming batch material proximate to the at least one charger above the glass forming material.

9. The method of claim 1 wherein the burner is mounted substantially perpendicular to the surface of the glass forming batch material.

10. The method of claim 9 wherein the burner is mounted up to 45 degrees away from the perpendicular and toward the downstream zone of the glass melting apparatus.

11. The method of claim 1 wherein the oxidant is selected from the group consisting of oxygen-enriched air, non-pure oxygen and "industrially" pure oxygen.

12. The method of claim 1 wherein the fuel is selected from the group consisting of methane, natural gas, liquefied natural gas, hydrogen, propane, liquefied propane gas, butane, low BTU gases, town gas, producer gas, oil, kerosene, diesel fuel, and mixtures thereof.

13. The method of claim 1 wherein the glass forming batch material comprises material selected from the group consisting of cullet, silica, feldspar, nepheline syenite, limestone, dolomite, soda ash, potash, borax, kaolin clay, alumina, arsenic, antimony, sulfates, sulfides, carbon, fluorides, barium oxide, strontium oxide, zirconium oxide, lead oxide, color forming metal oxides, and mixtures thereof.

14. The method of claim 13 wherein the glass forming batch material comprises silica, soda ash, and limestone for producing soda-lime-silica glass.

15. The method of claim 1 wherein operating the at least one oxy-fuel burner, includes impinging the flame over bubbles of fluid bubbling from the bubblers below the at least one oxy-fuel burner.

16. The method of claim 1 including providing bubblers that are radially disposed with respect to the center of the flame impingement contact area with the glass forming batch material surface.

17. The method of claim 1 including feeding melted glass through the downstream zone to a glass refining apparatus.

18. A method for melting glass forming batch material comprising:

charging the glass forming batch material to a glass melting apparatus;

impinging a flame from the combustion of fuel and oxidant proximate to the surface of the batch material to form a glass melt from the batch material; and, bubbling the glass melt in proximity to the impinging flame with at least one fluid capable of solution in the glass melt.

19. The method as in claim 18 wherein the fluid is selected from the group consisting of at least one of water, steam, hydrogen, hydrogen sulfide, oxygen, $SO_2$, $SO_3$, and hot exhaust flue gas.

20. The method as in claim 18 including maintaining an operating temperature in the glass melting apparatus in the range of about 2200° F. to about 2600° F.

21. The method of claim 18 including fully combusting reactive intermediate species proximate to or at the batch material surface.

22. The method of claim 18 including providing bubbling that is radially disposed with respect to the center of the flame impinging area proximate to the batch material surface.

23. The method of claim 18 including providing multiple flame impinging means wherein the bubbling the glass melt is associated with more than one said flame impinging means.

* * * * *